United States Patent [19]

Van Der Puy et al.

[11] Patent Number: 4,462,819

[45] Date of Patent: Jul. 31, 1984

[54] UREASE INHIBITED UREA BASED FERTILIZER COMPOSITIONS CONTAINING ORGANO BORON ACID COMPOUNDS

[75] Inventors: Michael Van Der Puy, Cheektowaga; Ralph C. Gatrone, Kenmore; Martin A. Robinson, Amherst; Larry L. Hendrickson, Camillus, all of N.Y.

[73] Assignee: Allied Corporation, Morris Township, Morris County, N.J.

[21] Appl. No.: 482,747

[22] Filed: Apr. 7, 1983

[51] Int. Cl.$^3$ ............................................... C05C 9/00
[52] U.S. Cl. ............................................ 71/28; 71/902
[58] Field of Search ............... 71/1, 11, 27, 28–30, 71/7, 902

[56] References Cited

U.S. PATENT DOCUMENTS 3,388,989  6/1968  Sor.
3,523,018  9/1970  Geissler et al..
3,565,599  5/1969  Sor et al..

*Primary Examiner*—Ferris H. Lander
*Attorney, Agent, or Firm*—Richard C. Stewart, II; Jay P. Friedenson

[57] ABSTRACT

The invention relates to novel urease inhibited fertilizer compositions containing urea and a urease inhibiting amount of one or more organo boron acid compounds, and to a method and composition for inhibiting the catalytic activity of urease through use of such compounds.

29 Claims, No Drawings

UREASE INHIBITED UREA BASED FERTILIZER COMPOSITIONS CONTAINING ORGANO BORON ACID COMPOUNDS

BACKGROUND OF THE INVENTIONS

1. Field of the Invention

This invention relates to urease inhibition especially as employed to converse soil applied urea. One more particular aspect of this invention relates to urease inhibited urea based fertilizer compositions which contain one or more organo boron acid derivatives as the urease inhibitors. Another particular aspect of this invention relates to methods of inhibiting the action of urease by use of such organo boron compounds, and methods of increasing plant yield through use of such methods of inhibition and the composition of this invention.

2. The Prior Art

It is well known in the art to use urea and urea compositions in fertilizers for application to the soil. The effective life of such fertilizers, however, is of short duration wherever microbiological activity exists in the soil to which the fertilizer is applied. This is due to the fact that urea is hydrolyzed rapidly, and nitrogen is lost in the form of ammonia, when urea is placed under or on the surface of moist soil which contains urease. Urease, a crystallizable enzyme occurring in numerous bacterial and fungi, as for example *micrococcus urease*, catalyzes the conversion of urea into ammonium carbonate which subsequently decomposes into ammonium bicarbonate and ammonia. The reactions are as follows:

A portion of the ammonia thus formed is held by absorbing constituents of the soil and is available to plants as nutrient. However, up to 50% of the ammonia may be lost to the air. A further problem resulting from the action of urease is that the accumulation of ammonium in the soil and rise in soil pH can lead to several problems, including damage to germinating seedlings and young plants.

One approach to reduction of problems resulting from the activity of soil urease toward soil applied urea is to find compounds that inhibit urease activity when applied to soils in conjunction with fertilizer urea. This approach has received considerable attention, and several compounds have been used. For example, U.S. Pat. No. 3,388,989 discloses a fertilizer composition consisting of urea, a hydrocarbon binder and a urease inhibitor such as formaldehyde; boron metal salts, such as sodium borate and potassium borate; fluorine metal salts and heavy metal ions with atomic weights greater than 50.00. U.S. Pat. No. 3,523,018 describes the use of inorganic or organic heavy metal salts such as copper sulfate, borax, and addition compounds of cupric cyanide, boron trifluoride, copper formate and copper acetate as urease inhibitors. Lastly, U.S. Pat. No. 3,565,599 describes a fertilizer composition which contains urea, certain hydrophobic chemicals and an inorganic boron compound as for example orthoboric acid, sodium perborate, potassium metaborates, tetraboric acid, ammonium pentaborate and ammonium tetraborate.

SUMMARY OF THE INVENTION

In accordance with the present invention there is provided a unique fertilizer composition which comprises urea and/or a compound which is capable of producing urea when applied to the soil and a "urease inhibiting effective amount" of one or more organo boron acid compounds of the formula:

$$R_1R_2BOH$$

wherein:

$R_1$ and $R_2$ are the same or different and are hydroxy or substituted aryl radicals wherein permissible substituents are one or more moieties selected from the group consisting of "electron donating groups", provided, however, that when either $R_1$ or $R_2$ is hydroxy, the other is a substituted aliphatic or aryl radical, or one or more compounds which are capable of forming such acid compounds in situ. Hereinafter the above-identified compounds will be referred to as "organo boron acid compounds". "Electron donating groups" are well known to those skilled in the art and are groups which tend to donate or release electrons to the remaining portion of the compound to a greater extent than hydrogen through inductive, resonance and other electronic effects.

Another aspect of this invention relates to a method of enhancing the yield and/or growth of plants by distributing the composition of this invention in the "plant growth media" in which the plant is being grown within reach of the root system of the plants (hereinafter referred to as "root zone"). As used herein, the term "plant growth media" refers to various natural and artificial media which support plant growth, including but not limited to soil, potting mixtures of organic and inorganic matter and artificial media such as polyurethane foam.

Yet another aspect of this invention relates to a method of inhibiting the urease catalyzed hydrolysis of urea applied to some growth media which comprises distributing a "urease inhibiting effective amount" of one or more of the aforementioned boron compounds to the plant growth media prior to, after or in conjunction with application of urea to said plant growth media and to a composition for carrying out such method. As used herein, a "urease inhibiting effective amount" is an amount of such boron compounds which when admixed with urea, is capable of inhibiting the urease catalyzed hydrolysis of any urea in the plant growth media.

It has been discovered that by distributing an urease inhibiting effective amount of one or more boron compounds in the plant growth media, the activity of urease in the medium is suppressed thereby preventing the rapid loss of urea from the media. Furthermore, by proper distribution of the boron compounds in the plant growth medium, the inhibition of the action of urease is effective over a prolonged period of time.

DETAILED DESCRIPTION OF THE INVENTION

The application of a urease inhibiting effective amount of one or more of the above-identified organo boron acid compounds is essential for the practice of this invention. Preferably, the amount of the organo boron acid compound impregnated or distributed in the plant growth medium is an amount sufficient to inhibit the urease catalyzed hydrolysis of substantially all urea present in the medium. Usually these goals can be achieved if the plant growth medium is impregnated with at least about 0.02 parts by weight of said one or more organo boron acid compounds per 1,000,000 parts of the plant growth medium. Hereinafter, the abbreviation of "p.p.m." designates parts of one or more organo boron acid compound per 1,000,000 parts of plant growth medium. In the preferred embodiments of this invention, the amount of said organo boron acid compounds contained in the composition is from about 0.02 p.p.m. to about 5000 p.p.m. weight percent based on the total weight of the composition of this invention and in the particularly preferred embodiments is from about 1 to about 1000 p.p.m. Amongst these particularly preferred embodiments of the invention, most preferred are those embodiments of the composition of this invention in which the weight percent of said one or more organo boron acid compounds is from about 5 p.p.m. to about 100 p.p.m.

Within the aforementioned limitations, the preferred amounts to be employed are dependent upon the particular situation. Thus, in determining the amount to be employed, consideration is made not only of the treatment need, i.e., soil pH, temperature, soil type, etc., but also of the mode of application to soil. When the one or more boron acid compounds is to be applied in a broadcast application, the amount in p.p.m. may frequently be less than in row or band application where, for a substantial depth and width within the vicinity of application, there can be a very high concentration of the one or more boron acid compounds. When application is made near the root zone or growing plants or when application is made immediately prior to seeding or transplanting, the amounts supplied are frequently at a lower rate than when application is made at the end of the growing season to prepare the soil for the following season. By dispersing very large dosages in growth media, a prolonged inhibition of the action of urease can be obtained over a period of many months. The concentration of the one or more boron acid compounds is eventually reduced to a minimum by decomposition in the soil.

In one method for carrying out the present invention, one or more organo boron acid compounds is distributed throughout the plant growth media in a broadcast application such as by spraying, dusting, distributing in irrigation water, etc. In such application, the one or more organo boron acid compounds are supplied in amounts sufficient to permeate the growing area of soil with a urease effective amount of one or more organo boron acid compounds. In field administration, the one or more organo boron acid compounds can be distributed in the soil in an amount and through such cross-section of the soil as to provide for the presence therein of a urease inhibiting effective amount of the one or more organo boron acid compounds. It is usually preferred that the one or more boron acid compounds be distributed to a depth of at least two inches below the soil surface.

In another method for carrying out the present invention, one or more boron acid compounds is administered to growth medium in a band or row application. In such application, administration is made with or without carrier in amounts sufficient to supply to soil or growth medium a urease inhibiting effective amount of the one or more boron acid compounds. After administration with or without discing or dragging, subsequent irrigation or rainfall distributes the one or more organo boron acid compounds throughout the growth medium.

In one embodiment of the present invention, the one or more boron acid compounds is distributed throughout the growth media prior to seeding or transplanting the desired crop plant.

In another embodiment, the soil is the root zone of growing plants is treated with the one or more boron acid compounds in an amount effective to inhibit the action of urease but sublethal to plant growth. By following such practice, no adverse effect is exerted by the one or more organo boron acid compounds upon growth of seeds or plants. Oftentimes, it is desirable to treat the soil adjacent to plants, and this procedure may be carried out conveniently in side-dressing operations.

In an additional embodiment, the soil is treated with the one or more boron acid compounds in conjunction with the application of urea or a compound capable of forming urea in situ on application to the plant growth media. The treatment with the one or more boron acid compounds can be carried out prior to, subsequent to or simultaneously with the application of the urea fertilizers. Such practice prevents the rapid loss of the urea added as fertilizer by the action of soil bacteria. The administration to the soil of one or more organo boron acid compounds in a urea based fertilizer composition constitutes a preferred embodiment of the present invention.

Urea is a well known, commercially available compound and will not be discussed herein in detail. Illustrative of compounds which are believed to form urea on addition to the soil are water soluble and formaldehyde condensation products, as for example methylolureas, methyleneureas and mixtures thereof. These products and a method for their preparation is described in detail in U.S. Pat. No. 3,462,256. Still other useful sources of urea are water-insoluble urea formaldehyde condensation products such as ureaform. Illustrative of useful water-insoluble urea and formaldehyde condensation products are those whose preparation and use are described in detail in U.S. Pat. Nos. 3,677,746 and 4,033,745.

The amount of urea or urea precursor compound included in the composition of this invention is not critical to the unique advantages thereof, and any amount known to those of skill in the art for use in fertilizers can be used. Normally, the amount employed will vary widely depending on a number of factors, including the times and frequency of application. In the preferred embodiments of the composition of this invention, the quantity of urea or urea precursor compound may vary from about 0.5 to about 95 weight percent based on the total weight of the composition, and in the particularly preferred embodiments may vary from about 1 to about 50 weight percent on the same basis. In the most preferred embodiments of the composition of this invention, the quality of urea and urea precursor compound will vary from about 3 to about 40 weight percent on the aforementioned basis.

The fertilizer composition of this invention may include other optional ingredients known to those of skill in the art for inclusion in fertilizer compositions. For example, the composition may include sources of potassium, sulfur, phosphorus, boron, zinc, iron, manganese, copper, molybdenum, cobalt and like micronutrient and macronutrients which may be deficient in the soil. Furthermore, the composition may also include plant growth regulators, as for example, auxins, cytokinins and the like, as well as pesticides, such as insecticides, miticides, herbicides, nematocides and the like. Moreover, the composition may include other inorganic and/or organic nitrogenous materials, such as anhydrous and aqueous ammonia, and inorganic ammonium salts, as well as, other urease inhibitors and nitrification inhibitors.

The composition of this invention can be conveniently prepared according to conventional methods known to those of skill in the art, and therefore such methods will not be described herein in great detail. Briefly stated, the various essential and optional ingredients can be granulated and mixed usually with a carrier and/or diluent, either liquid or solid. Suitable liquid carriers or diluents include water, petroleum, distillates or other liquid carriers. Suitable solid carriers or diluents include clay, talc, bentonite, diatomaceous earth, fullers earth and the like.

The composition of this invention can be conveniently used in the practice of the method of this invention to increase crop yield for a wide variety of plants including crop plants such as legumes, cereals, forest crops and the like. For example, the required amounts of the composition may be applied to the soil with the root zone of the plant at a rate of application sufficient to obtain the desired increase in plant yield. The rate of application will depend on a number of factors such as environmental conditions, type of crop plant and the like. The composition is usually applied at a rate of from about 5 to about 600 lbs of urea nutrient per acre in a total applied aqueous volume of from about 3 to about 1500 gallons per acre. In the preferred embodiments of the method of this invention, the composition is applied at a rate of from about 2 to about 100 pounds of urea nutrient per acre in a total applied aqueous volume of from about 6 to about 250 gallons per acre, and in the particularly preferred embodiments at a rate of from about 3 to about 30 pounds of urea nutrient per acre in a total volume of from about 9 to about 25 gallons per acre.

The required amounts of the composition can be used in the soil or applied to the foliage of the plant, upon the seeds, or the roots of plants without injuring either the foliage, seeds or roots at any time during the growing cycle. Because of the action of the novel urease inhibitors present in the composition, all or a portion of the urease present at the sites of application will be inhibited, and greater amounts of urea will be made available to the plant for longer periods of time.

The present invention can be carried out by distributing the one or more organo boron acid compounds in an unmodified form through growth medium. The present method also embraces distributing one or more such compounds as a constituent in liquid or finely divided solid compositions. In such practice, the one or more organo boron acid compounds can be modified with one or more additaments or soil treating adjuvants including water, petroleum distillates or other liquid carriers, surface-active dispersing agents, inert finely divided solids and fertilizers such as reduced nitrogen fertilizers. Preferred adjuvants are surface-active dispersing agents, inert finely divided solids, and especially, reduced nitrogen fertilizers; these adjuvants cooperate with the one or more organo boron acid compounds so as to facilitate the practice of the present invention and to obtain an improved result. Depending upon the concentration of the one or more organo boron acid compounds augmented compositions can be distributed in the soil without further modification or can be considered as concentrates and subsequently diluted with additional inert carrier to produce the ultimate treating composition. The required amount of the one or more organo boron acid compounds can be supplied to growth media in from 1 to 50 gallons of organic solvent carrier, in from 5 to 27,000 or more gallons of aqueous carrier or in from about 20 to 2000 pounds of solids carrier per acre treated. When an organic solvent carrier is employed, it can be further dispersed in the above volume of aqueous liquid carrier.

The concentration of one or more organo boron acid compounds in compositions to be employed for the treatment of growth media is not critical and can vary considerably provided the required dosage of effective agent is supplied to the growth media. In general, good results are obtained with liquid or solid compositions containing at least about 0.00001 percent by weight of the one or more organo boron acid compounds based on the total weight of the composition. In the preferred embodiments of the invention, the operations, however, composition contains from about 0.00001 to about 98 percent by weight of the one or more boron acid compounds, and the particularly preferred embodiments of the inventions contains from about 0.0001 t and 50 weight percent of the one or more organo boron acid compounds on the aforementioned basis. Amongst these particularly preferred embodments most preferred are those embodiments in which the amount of the one or more boron acid compounds is from about 0.001 to about 20 weight percent. Liquid or dust compositions in which the one or more organo boron acid compounds is present in higher concentrations can be utilized as such or can be employed as concentrate compositions to be diluted to prepare actual treating compositions.

Liquid compositions containing the desired amount of the one or more organo boron acid compounds can be prepared by dispersing the latter in one or more liquid carriers such as water or an organic solvent with or without the aid of a suitable surface active dispersing agent or emulsifying agent. Suitable organic solvents include acetone, di-isobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the growth media. Dispersing and emulsifying agents which can be employed in liquid compositions include condensation products of alkylene oxides with phenols and organic acids, alkyl aryl sulfonates, polyoxyalkylene derivatives or sorbitol ester, sugar esters, complex ether alcohols, mahogany soaps and the like. The surface active agents are generally employed in the amount of from 1 to 20 percent by weight of the substituted pyrazole.

Solid compositions containing the active one or more organo boron compounds can be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with a solid one or more organo boron compounds or wet with a liquid one or more organo boron compounds or a solution of dispersion of a solid or liquid one or more organo boron compounds in a volatile organic solvent. Depending upon the proportions of ingredients, these compositions can be employed without further modification or be considered concentrates and subsequently further diluted with solid surface active dispersing agent, talc, chalk, gypsum or the like to obtain the desired treating composition. Furthermore, such concentrate compositions can be dispersed in water with or without added dispersing agent or agents to prepare aqueous soil treating compositions.

Organo boron acid compounds which are useful as urease inhibitors in the composition and methods of this invention are those of the formula:

$$R_1R_2BOH$$

wherein:

$R_1$ and $R_2$ are the same or different and are hydroxy, or substituted aryl radicals wherein permissible substituents are one or more moieties selected from the group consisting of electron donating groups, provided, however, that when either $R_1$ or $R_2$ is hydroxy, the other is a substituted aryl radical.

Preferred for use in the composition and method of this invention are organo boronic acid compounds in which either $R_1$ or $R_2$ is hydroxy and the other remaining substituent is a substituted aryl group. Particularly preferred boronic acid compounds for use in the practice of this invention are those of the formula:

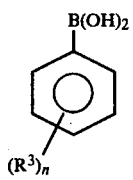

wherein:

$R^3$ is the same or different at each occurrence and is selected such that the sum of the Hammett sigma values ($\sigma$) for $R_3$ substituents is less than zero; and n is an integer from 1 to 5.

Hammett sigma values ($\sigma$) are well known in the art and are described in detail in Hammett, *Physical Organic Chemistry*, McGraw-Hill Book Co., Inc., New York, 1940 pp 184–199; and Jaffe, Chem Revs., 53, 191 (1953). Modified Hammett relationships are described in detail in Price and Michel, *J. Am. Chem. Soc.*, 74, 3652 (1952) and Elderfield and Siegel, ibid., 73, 5622 (1951). The "Hammett sigma" ($\sigma$) value for a substituent or substituents can be obtained most directly by measuring the effect of that substituent of substituents on the ionization constant of benzoic acid in water at 25° C., and is defined as:

$$\text{Hammett Sigma Value } (\sigma) = \log \frac{K_{(R^3)_n C_6H_{5-n}COOH}}{K_{C_6H_5COOH}}$$

where $R^3$ and n are as described hereinabove, and where $K_{(R^3)_n C_6H_{5-n}COOH}$ and $K_{C_6H_5COOH}$ are the ionization constants for the substituted and unsubstituted benzoic acid compounds, respectively. In the preferred embodiments of this invention the sum of the Hammett sigma ($\sigma$) values for all of the $R^3$ substituents on the phenyl moiety of the boronic acid urease inhibitors is equal to or less than about $-0.10$, and in the particularly preferred embodiments, the sum is equal to or less than about $-0.15$. Amongst these particularly preferred embodiments of this invention most preferred are those embodiments in which the sum of the Hammett sigma ($\sigma$) values for all of the $R^3$ substituents is equal to or less than about $-0.20$.

Illustrative of useful $R^3$ substituents are moieties of the formulas:

$$-NR_4R_5, -OR_6 \text{ and } -SR_7$$

wherein:

$R_4$ and $R_5$ are individually hydroxy, hydrogen, amido, alkoxy, alkyl, hydroxyalkyl, alkoxycarbonyl, or alkylcarbonyl;

$R_6$ is hydrogen, alkyl having from 1 to about 7 carbon atoms, phenyl or alkylphenyl having from 7 to about 14 carbon atoms; and $R_7$ is hydrogen or alkyl having from 1 to about 7 carbon atoms. Useful substituents falling within the scope of the aforementioned formulas are amino, ethanolamino, hydroxylamine methylamino, amino-carbonylamine hydroxylamine, dimethylamine, methyl ethylamine, phenyloxy, 2-methylphenoxy, hydroxy, methoxy, ethoxy, propoxy, mercapto, methylmercapto and the like.

In addition, two or more $R^3$ substituents may together form an alkylene chain, which chain may also include heteroatoms of oxygen, sulfur or nitrogen, to form various fused-ring substituents. For example, two $R^3$ substituents at the 3 and 4 positions of the above referenced aryl boronic acid compounds can form an alkylene chain of three or four carbon atoms to form the 5-indanyl and 6-tetralyl system, respectively. Similarly, two $R^3$ substituents can form an alkylene chain including one or two heteroatoms of oxygen to form the tetrahydrobenzofuran, or 3,4-methylenedioxyphenyl system, respectively; or two $R^3$ substituents can form an alkylene chain including one or more heteroatoms of nitrogen or sulfur to form tetrahydroquinoline or tetrahydrobenzothienyl, respectively.

Particularly preferred $R^3$ substituents are hydroxy, amino, amidoamino, mercapto, hydroxylamino, and alkoxycarbonylamino. Amongst these particularly preferred substituents most preferred are hydroxy and amino.

In the preferred embodiments of this invention, the boronic acid compounds will not include more than about three $R^3$ substituents. In the particularly preferred embodiments of the invention, the boronic acid compound will include one or two $R^3$ substituents, preferably in the ortho and/or para positions.

The composition of this invention may also include a compound which is capable of forming the desired boronic acid, in situ on addition to the soil. For example, dehydration of a boronic acid by heating yields the corresponding boronic anhydride or boroxine. The boroxine would be expected to react with soil moisture on addition to soil to form the desired boronic acid.

Useful boronic acid derivatives can be obtained from commercial sources or prepared in accordance with known preparative techniques. Phenylboronic acid can be treated with various reagents for electrophilic and nucleophilic aromatic substitutions to form the desired substituted phenylboronic acids. For example, phenylboronic acid can be treated with an alkyl chloride in the presence of aluminum chloride to form the desired alkylated products. Similarly, the phenylboronic acid can be treated with a mixture of nitric and sulfuric acids to form the nitrated products which can be reduced to the desired amine by a suitable reducing agent, as for example, iron and hydrochloric acid. The amine, in turn, can be reacted with alkyl iodide form the alkylamine, or with an alkanoic acid anhydride or halide to form the corresponding amide. Alternatively, the amine can be reacted with sodium nitrite and hydrochloric acid to form the corresponding diazonium salt, which can be reacted with any desirable nucleophilic species, as for example water, methyl mercaptan, hydroxylamine and primary or secondary amines, to form the desired product.

The following specific examples are present to more particularly illustrate the invention.

EXAMPLE I

Preparation of 2-Aminobenzeneboronic Acid

The Example I compound was prepared in accordance with the procedure of L. Verbit, J. S. Levy, H. Rabitz, and W. Kwalwasser, *Tetrahedron Lett.*, 1966, p. 1053, except that 10% palladium on carbon was used as the catalyst instead of 30%.

EXAMPLE II

Preparation of 4-Aminobenzeneboronic Acid

The compound of Example II was prepared according to the procedure of H. C. Beachell and D. W. Berstell, *Inorg. Chem.*, 1964, 3, 1028.

EXAMPLE III

Preparation 2-Hydroxyaminobenzeneboronic Acid Hydrochloride

Into a Parr shaker hydrogenation apparatus fitted with a hydrogen source and Parr bomb was charged 0.1 gm of a palladium on carbon hydrogenation catalyst obtained from Aldrich Chemical Co. under the trade designation Palladium on Carbon, 100 mL of methanol containing 1 equivalent of hydrochloric acid, and 0.8 gm of 2-nitrophenyl-boronic acid prepared in accordance with the procedure described in W. Leaman and J. R. Johnson, *J. Am. Chem. Soc.*, 1931, 53, 711. The apparatus was sealed and was flushed with hydrogen gas and maintained under 42 psi of hydrogen at a temperature of 24° C. for 4 hr. Solids were then removed by filtration, and the filtrate was vacuum concentrated. The tan, hygroscopic solid product (mp 185°–187° C. (dec)) was isolated by filtration:

NMR (DMSO-d6): $\delta 7.0$–7.8 (m, 4H), 4.0–6.8 (bs, 5H) $\delta$ 14.0–68 (b2, 5H)

IR Bands (nujol): 3350, 1620, 1750 and 760 cm$^{-1}$

EXAMPLE IV

Preparation of 3-Hydroxyaminobenzene-boronic Acid Hydrochloride

Employing the procedure of Example II, 3-nitrophenylboronic acid (3.0 g) was hydrogenated at 42 psi in 100 mL ethanol containing 2.2 mL conc. HCl on a Parr shaker for 3 hours, using palladium on carbon as catalyst. After filtering the filtrate was concentrated, yielding 3.3 g white, hygroscopic solid having a melting point of greater than 300° C. Spectral data were consistent with 3-hydroxylaminobenzeneboronic acid hydrochloride:

NMR (DMSO-d6): $\delta 10.4$ (bs, 5H) 7.0–8.2 (m, 4H);

IR (nujol): 3490, 1200, 1115, 1075, 1010, 800, 715, 709 cm$^{-1}$.

EXAMPLE V

Preparation of 4-Hydroxyaminobenzeneboronic Acid Hydrochloride

Employing the procedure of Example II, 1.1 gms of 4-nitrophenylboronic acid was hydrogenated at 42 psi in 50 ml of methanol containing 0.7 ml of conc. HCl on a Parr shaker hydrogenation apparatus for 3 hours using palladium on carbon as catalyst. After filtering, the filtrate was concentrated yielding 0.91 gms of a white-powdery solid having a melting point of 200°–205° C. (decomposition).

NMR ($\delta$) (DMSO-d6): 7.7(d), 7.3(d) and 6.7–7.2(bs)

IR (major bands) (nujol): 3400, 1500 and 710 cm$^{-1}$

EXAMPLE VI

Preparation of 3-Ureidophenylboric Acid

3-Aminophenylboric acid hemisulfate (5.0 g, 0.027 mol) was dissolved in 15 mL of acetic acid and 30 mL of water, and the solution warmed to 35° C. with stirring. To this solution was then added, over a 20 minute period, a solution of 4.4 g (0.054 mol) of potassium cyanate in 20 mL of water. After the addition was complete, the resulting solution was heated to 50°–60° C. for 2 hours. The reaction mixture was then cooled to 0° C. and filtered and the solid product collected. The solid was washed 2×20 mL ice water and dried (3.3 g). The compound appeared to lose water on heating to 200° C. but did not melt even at 250° C.

NMR (DMSO-d6): $\delta 8.35$ (s, 1H), 7.87 (s, 2H), 7.05–7.7 (m, 4H), 5.73 (s, 2H)

IR (nujol): 1640 cm$^{-1}$ (C=0),

Anal Calcd: for $C_7H_9BN_2O_3$: C, 46.72; H, 5.04; N, 15.57; Found: C, 46.35; H, 4.85; N, 15.45.

EXAMPLE VII

Preparation of Borophthalide o-Bromobenzyl alcohol (25 g), dihydropyran (68 g) and two drops concentrated HCl were mixed at 0° C. and warmed slowly to 40° C. over 3 hours and held at 40° C. for an additional 3 hours. The mixture was diluted with 100 mL $CH_2Cl_2$, washed with bicarb and water, and dried ($K_2CO_3$). Distillation gave the desired tetrahydropyraryl ether of o-bromobenzyl alcohol (22.7 g colorless oil, bp 126°–127° C. at 0.09 mm).

A grignard was prepared from 0.73 g Mg and 8.0 g of the above tetrahydropyranyl ether in 30 mL THF (tetrahydrofuran) at reflux (about 1 hour). This was cooled and transferred via syringe to a dropping funnel. The grignard solution was added dropwise over 20 minutes to a solution of 6.9 g tributylborate in 30 mL dry THF at 5° C., then stirred at room temperature overnight. HCl (10 mL, 1N) was added, the mixture filtered, and the THF removed from the filtrate under reduced pressure. The resulting aqueous solution was extracted with 3×100 mL ether. After removing all volatiles from the combined ether extracts, 4.1 g white solid was obtained, which was recrystallized from ether-pet ether, mp 94°–96° C. NMR (CDCl$_3$) $\delta$ 5.12 (s, 2H), 6.38 (s, 1H0, 7.3–7.6 (m, 3H), 7.6–7.8 (m, 1H). Anal. Calcd. for $C_7H_7BO_2$: C, 62.77; H, 5.27; B, 8.07%. Found: C, 62.81; H, 5.41; B, 7.85%.

EXAMPLE VIII

Preparation of 4-Hydroxy-4,3-boroxaroisoquinoline

The compound of Example VIII was prepared in accordance with the following modification of the procedure of H. R. Snyder, A. J. Reedy, and W. J. Lennarz, *J. Am. Chem. Soc.*, 1958, 80 835.

A solution of 0.44 g (11 mmol) NaOH in 25 mL methanol was prepared. To 12 mL of this solution was added 0.75 g (5 mmol) o-formylbenzeneboronic acid. The remainder of the NaOH solution, cooled in ice, was combined with 0.43 g (6 mmol) hydroxylamine hydrochloride, and stirred 5 minutes. The two solutions were then combined and stirred 2 hours at room temperature. After neutralizing with HCl, methanol was removed under reduced pressure and the residue recrystallized from water (yield 0.54 g, 74%). Mass spectrum: $C_7H_6BNO_2$: C, 57.22; H, 4.12; B, 7.36%. Found: C, 56.95; H, 4.19; B, 7.42%. NMR (DMSO-$d_6$) $\delta$ 9.34 (s, 1H), 8.63 (s, 1H), 8.0–8.2 (m, 1H), 7.6–7.9 (m, 3H).

EXAMPLE IX

Preparation of 3-Hydroxybenzeneboronic Acid

The Example IX compound was prepared following the procedure of F. R. Bean and J. R. Johnson, *J. Am. Chem. Soc.*, 1932, 54, 4421.

EXAMPLES X TO XIX

Evaluation of Urease Inhibiting Activity

Certain selected organo boron acid compounds were evaluated for urease inhibiting activity. The tests were run in a New York soil (Cazenovia sandy loam pH 7.2). Test A evaluations (run in triplicate) consisted of applying 800 μg of test compound in 5 mL water and 42.8 mg urea in 1 mL water to 20 g air-dry soil in a glass bottle. The bottle was capped with perforated aluminum foil and incubated at 25° C. for 3 days prior to extraction with a 100 mL 2M KCL solution containing 0.5 mg phenylmercuric acetate. The extracts were then analyzed for remaining urea using an autoanalyzer. Test B evaluations were run in a similar fashion except that the test compound was incubated in the soil for 3 days before urea was added. Analysis was performed 3 days after the urea addition, as Test A. Results of Tests A and B are given as percent inhibition, relative to the control without test compound.

The results of these tests are set forth in the following Table I. In these tests the urease inhibiting activity of the test compounds was rated as follows:
A = excellent inhibition
B = partial inhibition
C = no inhibition

TABLE 1

| EXAMPLE | COMPOUND | % INHIBITION (TEST A) | % INHIBITION (TEST B) |
|---|---|---|---|
| X | 2-Aminobenzeneboronic Acid | C | A |
| XI | 3-Aminobenzeneboronic Acid Hemisulfate | A | A |
| XII | 4-Aminobenzeneboronic Acid | B | A |
| XIII | 2-Hydroxylamino-benzeneboronic Acid Hydrochloride | C | A |
| XIV | 3-Hydroxylamino-benzeneboronic Acid Hydrochloride | B | B |
| XV | 4-Hydroxylaminobenzene-boronic Acid Hydrochloride | A | A |
| XVI | 3-Ureidophenylboric Acid | C | B |
| XVII | Borphthalide | C | A |
| XVIII | 4-Hydroxy-4,3-boroxaroiso-quinoline | B | B |
| XIX | 3-Hydroxybenzeneboronic Acid | B | A |

What is claimed is:

1. A composition comprising urea and a urease inhibiting effective amount of one or more organo boron acid compounds of the formula:

$$R_1R_2BOH$$

wherein:
$R_1$ and $R_2$ are the same or different and are hydroxy or substituted aryl radicals wherein permissible substituents are one or more moieties selected from the group consisting of electron donating groups, provided, however, that when either $R_1$ or $R_2$ is hydroxy, the other is substituted aryl; or one or more compounds which are capable of forming such acid compounds in situ.

2. A composition according to claim 1 wherein said compounds are boronic acid compounds of the formula:

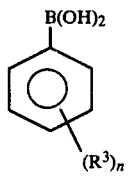

wherein:
$R^3$ is the same or different at each occurrence and is selected such that the sum of the Hammett sigma ($\sigma$) values for $R^3$ substituents is less than zero; and n is an integer from 1 to 5;
or one or more compounds which are capable of forming such boronic acid compounds under the use conditions of the composition.

3. A composition according to claim 1 wherein said urease inhibiting amount is at least about 0.00001 weight percent based on the total weight of the composition.

4. A composition according to claim 3 wherein said amount is from about 0.00001 to about 98 weight percent.

5. A composition according to claim 4 wherein said amount is from about 0.0001 to about 50 weight percent.

6. A composition according to claim 5 wherein said amount is from about 0.001 to about 20 weight percent.

7. A composition according to claim 2 wherein said sum of the Hammett sigma ($\sigma$) values for R substituents is equal to or less than about −0.1.

8. A composition according to claim 7 wherein said sum is equal to or less than about −0.5.

9. A composition according to claim 8 wherein said sum is equal to or less than about −0.8.

10. A composition according to claim 2 wherein $R^3$ substituents are selected from the group consisting of moieties of the formulas:

$$-NR_4R_5, -OR_6 \text{ or } -SR_7$$

wherein:
$R_4$ and $R_5$ are individually hydroxy, amido, hydrogen, alkoxycarbonyl, alkoxy, alkylcarbonyl, alkyl or hydroxyalkyl wherein the alkyl moiety include from 1 to about 7 carbon atoms;
$R_6$ is hydrogen, alkyl having from 1 to about 7 carbon atoms or phenyl either unsubstituted or substituted with one or more alkyl or alkoxy substituents each having from 1 to about 7 carbon atoms; and
$R_7$ is hydrogen or alkyl having from 1 to about 7 carbon atoms;
or two or more $R^3$ substituents together may form an alkylene or alkenylene chain which may include one or more divalent heteroatoms of oxygen, sulfur or nitrogen completing a fused ring substituent.

11. A composition according to claim 10 wherein said $R^3$ substituents are selected from the group consisting of mercapto, hydroxy and hydroxylamino.

12. A method of enhancing plant yield which comprises applying a composition according to claim 1 to the soil immediately surrounding said plant.

13. A method of inhibiting the activity of urease in a growth medium which comprises applying to said medium a urease inhibiting effective amount of one or more organo boron acid compounds of the formula:

$$R_1R_2BOH$$

wherein:
$R_1$ and $R_2$ are the same or different and are hydroxy or substituted aliphatic or aryl radicals wherein permissible substituents are one or more moieties selected from the group consisting of electron donating groups, provided, however, that when either $R_1$ or $R_2$ is hydroxy, the other is substituted aryl, or one or more compounds which are capable of forming such acid compounds in situ.

14. A method according to claim 13 wherein said compound is a boronic acid compound of the formula:

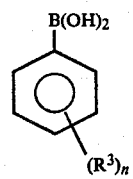

wherein:
$R^3$ is the same or different at each occurrence and is selected such that the sum of the Hammett sigma ($\sigma$) values for R substituents is less than zero; and n is an integer from 1 to 5;
or one or more compounds which are capable of forming such boronic acid compounds under the use conditions of the composition.

15. A method according to claim 13 wherein said urease inhibiting amount is at least about 0.02 p.p.m.

16. A method according to claim 15 wherein said amount is from about 0.02 to about 5000 p.p.m.

17. A method according to claim 16 wherein said amount is from about 1 to about 1000 p.p.m.

18. A method according to claim 17 wherein said amount is from about 5 to about 100 p.p.m.

19. A method according to claim 14 wherein said sum of the Hammett sigma ($\sigma$) values for R substituents is equal to or less than about $-0.1$.

20. A method according to claim 19 wherein said sum is equal to or less than about $-0.5$.

21. A method according to claim 20 wherein said sum is equal to or less than about $-0.8$.

22. A method according to claim 14 wherein $R^3$ substituents are selected from the group consisting of moieties of the formulas:

$$-NR_4R_5, -OR_1 \text{ or } -SR_7$$

wherein:
$R_4$ and $R_5$ are individually hydroxy, hydrogen, amido alkoxycarbonyl, alkoxy, alkylcarbonyl, alkyl or hydroalkyl wherein the alkyl moiety includes from 1 to about 7 carbon atoms;
$R_5$ is hydrogen, alkyl or alkoxy substituents each having from 1 to about 7 carbon atoms; and
$R_7$ is hydrogen or alkyl having from 1 to about 7 carbon atoms;
or two or more $R^3$ substituents together may form an alkylene chain which may include one or more divalent heteroatoms of oxygen, sulfur or nitrogen completing a fused ring substituent.

23. A method according to claim 21 wherein said $R^3$ substituents are selected from the group consisting of amino, mercapto, hydroxy and hydroxylamino.

24. A method according to claim 13 which further comprising applying urea, or a compound capable of forming urea in situ to said plant growth medium prior to, in conjunction with or subsequent to application of said one or more compounds to said medium.

25. A method according to claim 24 wherein said urea is added to said plant growth medium subsequent to application of said compound.

26. A method according to claim 25 wherein said urea is applied to said medium, not more than 10 days after application of said compounds.

27. A method according to claim 26 wherein said urea is applied to said medium not more than 5 days after application of said compounds.

28. A method according to claim 27 wherein said urea is applied to said medium not more than 2 days after application of said compounds.

29. A fertilizer composition which comprises a urea and/or one or more urea precursor compounds capable of forming urea under the use conditions of said composition and urease inhibiting effective amount of one or more organo boron acid compounds of the formula:

$$R_1R_2BOH$$

wherein:
$R_1$ and $R_2$ are the same or different and are hydroxy or substituted aliphatic or aryl radicals wherein permissible substituents are one or more moieties selected from the group consisting of electron donating groups, provided, however, that when either $R_1$ or $R_2$ is hydroxy, the other is substituted aryl, or one or more compounds which are capable of forming such acid compounds in situ.

* * * * *